United States Patent
Rohlfing et al.

(10) Patent No.: US 8,837,682 B2
(45) Date of Patent: Sep. 16, 2014

(54) LINE PERFORMANCE MEASURE

(71) Applicant: British Telecommunications public limited company, London (GB)

(72) Inventors: David Michael Rohlfing, London (GB); Mark Andrew Fletcher, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 14/347,823

(22) PCT Filed: Sep. 21, 2012

(86) PCT No.: PCT/GB2012/000736
§ 371 (c)(1),
(2), (4) Date: Mar. 27, 2014

(87) PCT Pub. No.: WO2013/045871
PCT Pub. Date: Apr. 4, 2013

(65) Prior Publication Data
US 2014/0226798 A1    Aug. 14, 2014

(30) Foreign Application Priority Data
Sep. 30, 2011    (EP) .................................... 11250830

(51) Int. Cl.
H04M 1/24        (2006.01)
H04M 3/08        (2006.01)
H04M 3/22        (2006.01)
(52) U.S. Cl.
CPC ...................................... H04M 3/22 (2013.01)
USPC .......... 379/24; 379/29.05; 379/29.09; 379/30
(58) Field of Classification Search
USPC ............... 379/1.01, 9, 9.04, 10.01, 15.01, 22, 379/22.03, 22.04, 22.05, 22.07, 23, 24, 379/26.02, 29.05, 29.09, 30
See application file for complete search history.

(56) References Cited

U.S. PATENT DOCUMENTS

| | | | | |
|---|---|---|---|---|
| 5,615,225 A | * | 3/1997 | Foster et al. | 379/29.01 |
| 5,790,634 A | * | 8/1998 | Kinser et al. | 379/29.01 |
| 5,953,389 A | * | 9/1999 | Pruett et al. | 379/9 |
| 2003/0063712 A1 | | 4/2003 | Chattell et al. | |
| 2007/0208537 A1 | | 9/2007 | Savoor et al. | |

FOREIGN PATENT DOCUMENTS

| | | |
|---|---|---|
| EP | 1 530 353 | 5/2005 |
| EP | 2 107 772 | 10/2009 |
| WO | WO 02/080506 | 10/2002 |
| WO | WO 2006/078934 | 7/2006 |

OTHER PUBLICATIONS

International Search Report for PCT/GB2012/000736, mailed Nov. 29, 2012.

* cited by examiner

*Primary Examiner* — Binh Tieu
(74) *Attorney, Agent, or Firm* — Nixon & Vanderhye PC

(57) ABSTRACT

A method is proposed for calculating a line performance, or stability, measure for a telephone line. Various physical parameters associated with the line, such as insulation resistance, capacitance and DC voltages, are measured. The values for each of the parameters are compared to expected values, which are based on historical values measured for that line. Individual performance measures for each parameter are calculated based on the difference between the actual and expected values, normalised by the deviation of that parameter. The deviation accounts for general fluctuations across all the lines. A weighting value is also applied, based on knowledge of values relevant to the good operation of lines. The deviation effectively gives a scaling, and the weighting gives a context to the measured values for a single line. The individual performance measures are summed to get the final performance measure for the line. Thus, the performance measure for the line gives an indication of the stability of that line, based on analysis of the past performance of that line, and taking into account the general fluctuations seen over all lines.

5 Claims, 2 Drawing Sheets

US 8,837,682 B2

LINE PERFORMANCE MEASURE

This application is the U.S. national phase of International Application No. PCT/GB2012/000736, filed 21 Sep. 2012, which designated the U.S. and claims priority to EP Application No. 112508320.4, filed 30 Sep. 2011, the entire contents of each of which are hereby incorporated by reference.

FIELD OF THE INVENTION

This invention relates to testing of telephone lines between a telephone exchange and customer premises, in particular a method of determining a performance measure for a telephone line.

BACKGROUND TO THE INVENTION

In a public switched telephone network (PSTN), a telephone line made of a pair of wires (typically copper) runs from a telephone exchange to a customer premises. The pair of wires can be used to provide telephony as well as data services to the customer premises.

Telephone lines are prone to faults, thus adversely affecting the telephony or data services that may be running over them. Some of these faults are easily identified and rectified, others less so. Typical faults include disconnections, and short circuit between the wires. Various methods have been developed to help identify the faults and propose solutions.

Many methods are based on performing electrical tests on the line, such as measuring the resistance of the line or the AC and DC voltages. These can then be compared to thresholds, and a line may be flagged as faulty if a number of the tests exceed their respective threshold.

US2003/0063712 describes a method for performing the likely location of a fault in a telecommunications system by comparing a test measurement on a line with a reference value and deriving from that comparison the likely location of the fault.

However, such tests are not always accurate, especially when the performance of a line fluctuates and changes over time and during testing. Thus, at the time of testing, the line may appear to perform well, but in the past, there may have been problems.

SUMMARY OF THE INVENTION

It is the aim of embodiments of the present invention to provide an improved method of determining the performance or stability of a telephone line.

According to one aspect of the present invention, there is provided a method of determining the stability of a telephone line in a network, said method comprising:
(i) determining an expected value for each of a plurality of parameters associated with a test telephone line, wherein the expected value is based on previously measured values of the respective parameter for said test telephone line;
(ii) for each of the plurality of parameters, determining a deviation value based on the variation of previously measured values for said parameter across a plurality of telephone lines;
(iii) generating individual parameter performance indicators for each of the plurality of parameters associated with the test telephone line, wherein the individual parameter performance indicator for a given parameter is a function of the difference between the present value of that parameter and the expected value for that parameter for the test telephone line,
the deviation value for that parameter, and
a weighting factor dependent on both the present value of that parameter and the expected value of that parameter;
(iv) generating a performance indicator for the test telephone line based on the sum of the individual parameter performance indicators for each of the plurality of parameters of the test telephone line.

Examples of the invention are particularly useful in helping qualify how accurate other test results are. The performance indicator is in effect a measure of the stability of the line, and by knowing how stable the line is, analysis of other test results as well as deciding when to test a line can be done in an informed manner. For example if a line test determines a line to be operating correctly, but the performance indicator indicates that the lines is unstable, then there may well be a fault on the line, but did not show up with this instance of testing.

Furthermore, the performance indicator can be used to determine when to perform periodic line testing, with a greater focus on the lines that are less stable. Focussed testing is beneficial as it means that no unnecessary tests are performed, and thus the life of the mechanical relays that are used in switching over to test equipment in the telephone exchange can be extended. These relays tend to have a limited lifespan before they need to be replaced.

The previously measured values may be values measured over an elapsed period of time.

The weighting factor may be determined by using thresholds applied to the present value and expected values of that parameter.

The parameters may be associated with physical properties of a telephone line.

The method may further comprise comparing the line performance indicator to at least one threshold, and allocating a stability rating to the generated performance indicator based on the comparison.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

In examples of the present invention there is proposed a method for calculating a line performance or stability measure for a telephone line. When a customer reports a fault on a line, various physical parameters associated with the line, such as insulation resistance, capacitance and DC voltages, are measured at the telephone exchange.

The values for each of the parameters are compared to expected values, which are based on historical values measured for that same line. An individual performance measure for each parameter is calculated based on the difference between the actual and expected values, normalised by the deviation of that parameter. The deviation is based on the natural spread of measured values across the population of lines, which accounts for general fluctuations across all the lines. A weighting value is also applied, based on knowledge of values relevant to the good operation of lines. The deviation effectively gives a scaling, and the weighting gives a context to the measured values for a single line. The individual performance measures can be summed to get the final performance measure for the line. In general, the lower the score the better performing the line.

In effect, the performance measure for a line gives an indication of the stability of that line, based on analysis of the past performance of that line, and taking into account the general fluctuations seen over all lines.

Figure 1:
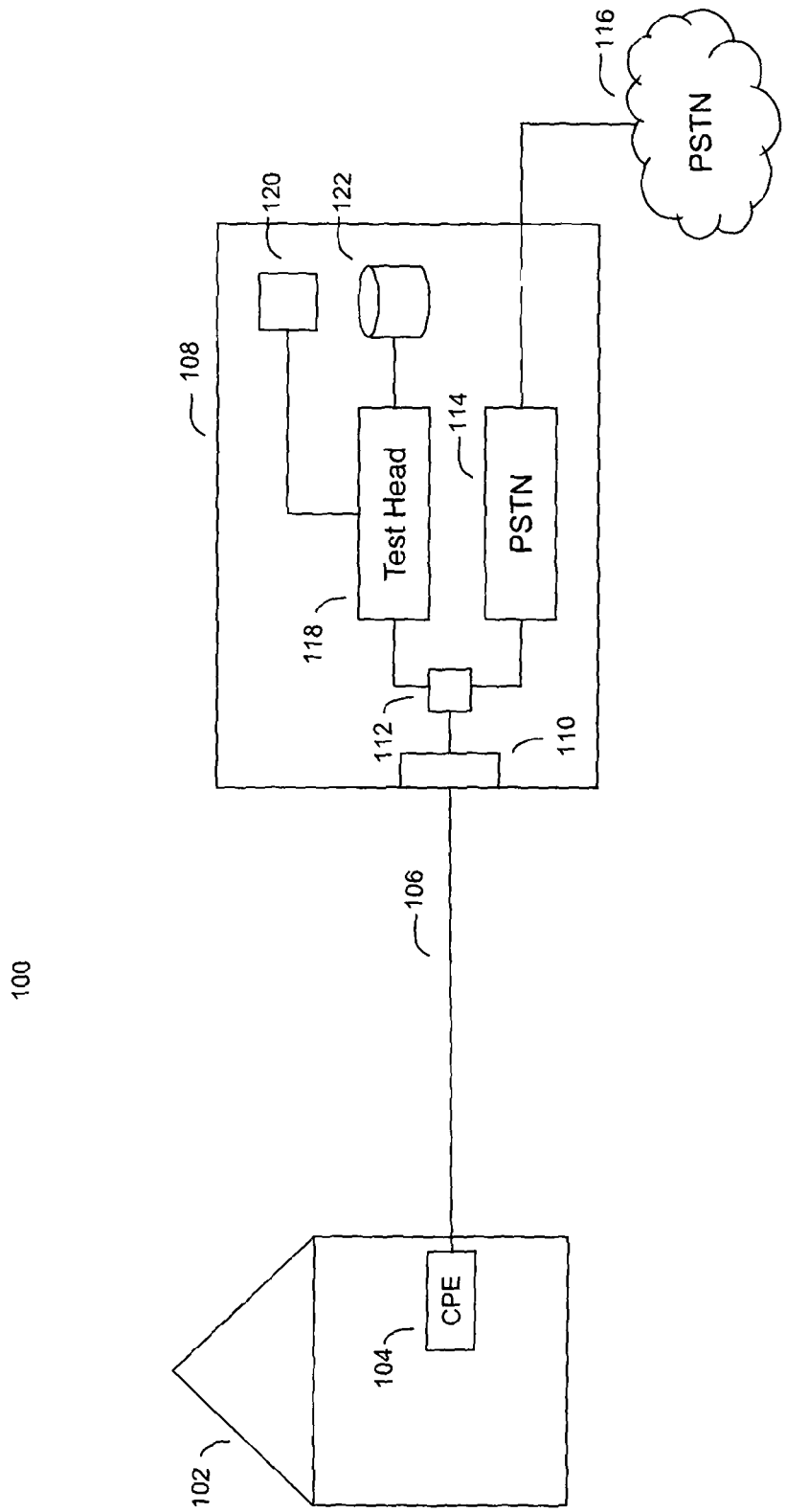
FIG. 1 is system diagram showing a customer premises connected to an exchange by way of a telephone line.

FIG. 1 illustrates a telecommunications network 100 comprising a customer's premises 102 and a telephone exchange 108. Within the customer premises 102 is customer premises equipment CPE 104, which typically is a device such as a telephone, router and such like. The exchange 108 houses a local switch 110. The local switch 110 in the exchange and the CPE 104 in the customer premises are connected to each other by a telephone line 106. The telephone line 106 is typically formed of a pair of copper wires.

Within the exchange 108, the local switch 110 is connected to a relay 112, which serves to selectively connect a given telephone line to one of PSTN equipment 114 or test head equipment 118. The PSTN equipment 114 is connected to the PSTN network 116. Under normal operation, the relay 112 operates to connect the telephone line to the PSTN equipment 114, thus providing the CPE 104 with PSTN services.

Other telephone lines from other customer premises may also be connected to the exchange 108, though for simplicity have not been shown in FIG. 1. Thus, the exchange 108 will provide PSTN services to a large number of customer premises, each with their own CPE, and each having their own telephone line.

In the telephone line 106, the two wires are usually labelled as the A-leg and B-leg. The B-leg has a DC bias voltage of 50V, applied at the exchange using a battery located within the exchange.

The telephone line 106 is prone to faults, with various causes. For example, the line may become interrupted by a disconnection at a connection point along the line (not shown in FIG. 1). A roadside cabinet and junction box on a telegraph pole are examples of connection points. Water ingress at a connection point can also cause problems, resulting in short circuits between the A-leg and B-leg wires, or earthing problems.

The test head equipment 118 comprises a group of electrical testing units that apply a sequence of known AC and DC voltages and measure the resultant currents and voltages. The test head 118 can be brought in circuit with the telephone line 106 by the switching of the relay equipment 112. Switching over to the test head equipment 118 will mean that the PSTN equipment 114 is disconnected, and thus no PSTN service can be provided over the telephone line 106 when the test head equipment 118 is connected. The test head equipment 116 and relay 112 used to switch to it can be controlled by a control module or processor 120. A data store 122 is also provided, which can store measurements generated by the test head equipment 118.

A number of parameters associated with the telephone line are measured by the test head equipment 118. The parameters are based around various physical properties associated with the line: resistances, DC voltages, and capacitance. The list below identifies the parameters measured, together with a short description of that parameter:

Resistance AtoEarth—insulation resistance measured from the A-leg of the telephone line to earth, expressed in ohms.

Resistance BtoEarth—insulation resistance measured from the B-leg of the telephone line to earth, expressed in ohms.

Resistance AtoB—insulation resistance measured from the A-leg to the B-leg of the telephone line, expressed in ohms.

Resistance BtoA—insulation resistance measured from the B-leg to the A-leg of the telephone line, expressed in ohms.

Resistance AtoBatt—insulation resistance measured from the A-leg of the telephone line to the exchange battery contact, expressed in ohms.

Resistance BtoBatt—insulation resistance measured from the B-leg of the telephone line to the exchange battery contact, expressed in ohms.

DC voltage AtoEarth—DC voltage measured from A-leg of the telephone wire to earth, expressed in volts.

DC voltage BtoEarth—DC voltage measured from B-leg of the telephone wire to earth, expressed in volts.

DC voltage AtoB—DC voltage measured from A-leg to B-leg of the telephone wire, expressed in volts.

Capacitance balance—first measuring the A-leg to earth capacitance and the B-leg to earth capacitance, and where the capacitance balance results from the lower of the two measured values divided by the higher of the measured values. The capacitance balance is expressed as a percentage.

Note, insulation resistance is the resistance measured between two conductors separated electrically by resistant material. In the case of Resistance AtoB this will be the coatings applied to the wire used for each leg. If the insulating coatings applied to each wire are in good condition then the measured insulation resistance value should be large (greater than 1000000 ohms).

The above parameters are measured periodically by the test head equipment 118, say every few days, for each of the lines connected to the exchange, including telephone line 106. This can be done under control of the control module 120, with the results stored in the data store 122 together with the identity of the line that the parameters are associated with. The identity of the line is typically represented by a combination of the directory (telephone) number and a line number, which in combination will uniquely identify a line.

The time and date of when the measurements were made are also recorded and stored.

Figures 2, 3:
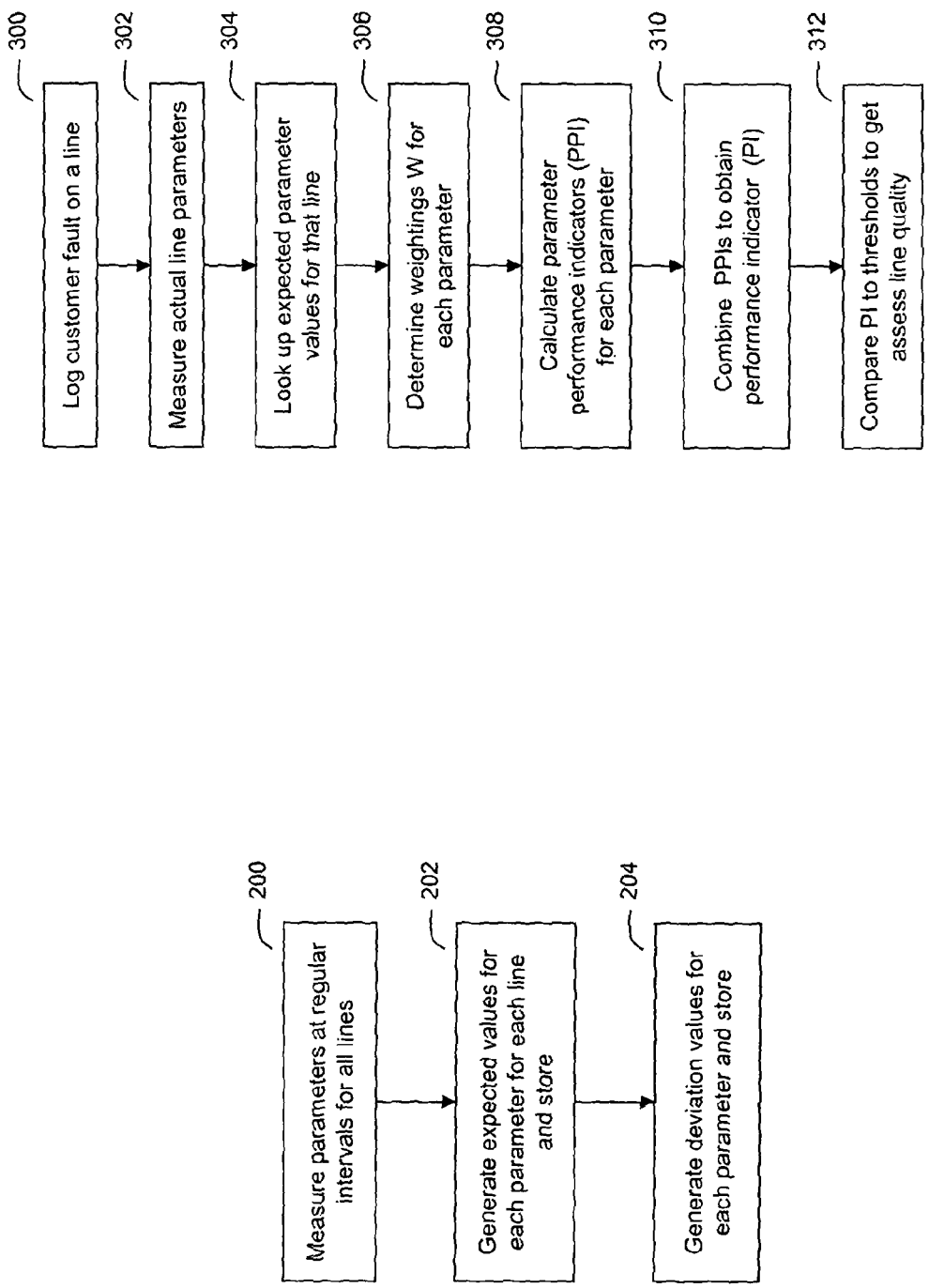
FIG. 2 is a flow chart illustrating the steps of periodically measuring the parameters associated with a number of telephone lines in an example of the invention.
FIG. 3 is a flow chart illustrating the steps of calculating a performance measure for a specific telephone line.

FIG. 2 illustrates the steps of periodically taking parameter measurements from a number of lines to build up a store of parameters.

In step 200, the parameters listed above are measured for a number of lines periodically. For example, measurements may be taken every few days. The values for the parameters are stored in the store 122, and are referred to as the "historical" values.

In step 202, expected values, expected(p), for each parameter p are calculated for each line. The expected values, expected(p), are the values that are representative of a parameter p for a given line. In a preferred example, expected(p) for a line is calculated as the statistical modal value of that parameter taken from the measurements taken over a recently elapsed period, such as the last 28 days. Expected values, expected (p), are calculated for each parameter p for each line in this manner, and stored in the store 122.

A person skilled will appreciate that expected(p) might be calculated some other way, such as by taking the median over an elapsed period, or taking some other average over an elapsed period, but with some additional biasing towards more recent measurements. Yet another way is to take the average over an elapsed period after excluding the highest and lowest measured values.

In step 204, a deviation value for each parameter is p calculated. A deviation value $\Delta_P$ represents how much a parameter typically varies across the entire population of the lines e.g. over the entire test population being measured, or a subset of the population. To calculate the deviation value $\Delta_P$ for a parameter p, first the historical values for that parameter p for a single line I are analysed, and the standard deviation $\sigma_{p,l}$ of those values is calculated. The same is repeated for the population of lines to generate a standard deviation for the parameter p for each of the lines.

The arithmetic mean of all the individual line standard deviations $\sigma_{p,l}$ is taken to give the deviation value for the relevant parameter as shown below:

$$\Delta_P = \frac{1}{n}\sum_{l=0}^{n} \sigma_{p,l}$$

This is repeated for all the parameters, and the resulting deviation values $\Delta_P$ stored in store 122.

FIG. 3 shows the steps taken when the performance measure for a line I is determined. In this example, in step 200 a customer logs a fault on a telephone line. This can be considered as reactively determining a performance measure. In alternative examples, the method may simply be triggered as part of a proactive diagnostic process, with a line selected periodically for testing.

In step 302, the parameters associated with the identified line I from step 300 are measured. The parameters measured are those described above, and are stored in the store 122 as the "actual" values for the parameters of a given line, and referred to as actual(p).

In step 304, the expected parameter values, expected(p), for the identified line I are retrieved from the store 122.

In step 306, a weighting W is calculated for each of the parameters measured. The details of how the weightings are calculated are set out below Firstly, a resistance involved in weighting decision. (RIW) value is calculated for each parameter that relates to resistance e.g. Resistance AtoB. Similarly, a capacitance involved in weighting decision (CIW) value is calculated for each parameter that relates to capacitance i.e. Capacitance balance. A DC voltage involved in weighting decision (DIW) value is calculated for each parameter that relates to DC voltage e.g. DC voltage AtoEarth.

The value of RIW is given by the lesser of the actual value and expected value for the parameter under consideration:

RIW=least(actual, expected)

The value of CIW is given by the lesser of the actual value and expected value for the parameter under consideration:

CIW=least(actual, expected)

The value of DIW is given by the larger of the absolute of the actual value and expected value for the parameter under consideration:

DIW=greater(abs(actual), abs(expected))

The value obtained for RIW/CIW/DIW are then compared to a predetermined range to determine the weighting. The table below shows the ranges for each of RIW/CIW/DIW and the resulting weighting value.

| Parameter type | Intermediate value | Range | Weighting, W |
|---|---|---|---|
| Resistance | RIW | <100 kohm | 25 |
| Resistance | RIW | >=100 kohm and <250 kohm | 5 |
| Resistance | RIW | >=250 kohm and <500 kohm | 1 |
| Resistance | RIW | >500 kohm | 0 |
| Capacitance Balance | CIW | <85 | 25 |
| Capacitance Balance | CIW | >=85 | 0 |
| DC voltage | DIW | >=30 v | 25 |
| DC voltage | DIW | >=20 v and <30 v | 5 |
| DC voltage | DIW | <20 v | 0 |

As an example, if the parameter under consideration is DC voltage AtoEarth, and the actual measured value is 29v, and the expected value is 45v, then DIW is 45v (the greater of the absolute values of 29v and 45v). Then, by examining the table above, a DIW of 45v falls in the range ">=30v", which results in a weighting, W, of 25. Thus, for the parameter DC voltage AtoEarth in this example as measured, the weighting W is 25.

The weightings are used in the preferred algorithm to emphasise the values or range of values of parameters that have particularly bearing on the performance of a line. A number of weighting schemes are possible, with the above method being one example. The step change scheme used here is attractive because it is straightforward to implement.

In step 308, a single parameter line performance measure, or partial performance indicator PPI(p), is calculated as follows:

$$PPI(p) = \frac{abs(actual(p) - expected(p))}{\Delta_P} \times W$$

where actual(p) is the actual measured value of parameter p as described in step 302, expected(p) is the expected value of parameter p as described in step 202, W is the weighting described above, and $\Delta_p$ represents the deviation value for parameter p as described in step 204.

PPI(p) is calculated for each parameter p for the line under consideration.

In step 310, the PPI(p) for each parameter p is combined to give a single overall line performance measure. This may be referred to as a performance indicator, or PI. Thus:

PI=ΣPPI(p)

In the method described, a lower PI score represents a better performing line.

By looking at the expected parameter values of a line, as well as taking into account the general fluctuations of parameter values seen over all lines, the performance indicator PI gives an indication of the line stability, and whether the performance of a line is in line with expectations or not.

In step 312, the PI score can be compared to thresholds in order to give the line a stability rating. For example, two thresholds may be set: a "stable" threshold and an "unstable" threshold. A line can be rated as:
  Stable: when PI<=stable threshold
  Unstable: when PI>unstable threshold
  Potentially unstable: when PI is between the stable and unstable thresholds When a line is rated as stable, it indicates that the line is performing in line with expectations.

When a line is rated as unstable, it indicates that the line is exhibiting significant variation in its performance from expectations. This could mean that any other line tests that are being performed may not be reliable, especially if the other line tests are instantaneous tests, which may not be reliable if the line is fluctuating a lot at the time of testing.

When a line is rated as potentially unstable, there may be issues with the line. Further tests may be useful on such a line.

A simpler rating system might be used instead of either stable or unstable, which can be achieved using a single threshold.

When setting a schedule for routine testing using other line test systems, the PI may be used to determine the optimum rate of testing for each line. For example, lines with a PI rating of STABLE would be assigned a frequency of testing H, those rated UNSTABLE would be assigned a frequency of testing F3, and those POTENTIALLY UNSTABLE a frequency of testing F2. Then, by setting F1<F2<F3, the routine testing would be able to focus on the lines that require the most monitoring. This approach would be particularly beneficial if there were finite limits to the number of tests that could be run.

Thus, the performance indicator is very useful when used in conjunction with other tests to help qualify how accurate the other test results are. For example if a general line test returns OK, but has a PI of unstable, it indicates that there may be a fault on the line but it does not show with every line test (because the general line tests are snapshots). Additionally, an engineer examining the line should be made aware that the line tests they he might run may also not find the fault this is likely to be a line that is degrading and if not repaired is likely to result in a repeat call. With time it should degrade enough to make finding the fault easy. In an alternate example, where a line test is not OK and PI is unstable indicates that the line state is still changing, so after any repair the line should be monitored to check that there is not another hidden fault.

Exemplary embodiments of the invention are realised, at least in part, by executable computer program code which may be embodied in an application program data. When such computer program code is loaded into the memory of a CPU in the control module 120 for execution, it provides a computer program code structure which is capable of performing at least part of the methods in accordance with the above described exemplary embodiments of the invention.

A person skilled in the art will appreciate that the computer program structure referred can correspond to the flow charts shown in FIGS. 2 and 3, where each step of the flow chart can correspond to at least one line of computer program code and that such; in combination with the CPU in the control module 120, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of determining the stability of a telephone line in a network, said method comprising:
   (i) determining an expected value for each of a plurality of parameters associated with a test telephone line, wherein the expected value is based on previously measured values of the respective parameter for said test telephone line;
   (ii) for each of the plurality of parameters, determining a deviation value based on the variation of previously measured values for said parameter across a plurality of telephone lines;
   (iii) generating individual parameter performance indicators for each of the plurality of parameters associated with the test telephone line, wherein the individual parameter performance indicator for a given parameter is a function of
      the difference between the present value of that parameter and the expected value for that parameter for the test telephone line,
      the deviation value for that parameter, and
      a weighting factor dependent on both the present value of that parameter and the expected value of that parameter;
   (iv) generating a performance indicator for the test telephone line based on the sum of the individual parameter performance indicators for each of the plurality of parameters of the test telephone line.

2. A method according to claim 1, wherein the previously measured values are values measured over an elapsed period of time.

3. A method according to claim 1, wherein the weighting factor is determined by using thresholds applied to the present value and expected values of that parameter.

4. A method according to claim 1, wherein the parameters are associated with physical properties of a telephone line.

5. A method according to claim 1 further comprising, comparing the line performance indicator to at least one threshold, and allocating a stability rating to the generated performance indicator based on the comparison.

* * * * *